(12) United States Patent
Kadambi et al.

(10) Patent No.: US 12,468,008 B2
(45) Date of Patent: Nov. 11, 2025

(54) UNSUPERVISED LOCATION ESTIMATION AND MAPPING BASED ON MULTIPATH MEASUREMENTS

(71) Applicant: QUALCOMM Incorporated, San Diego, CA (US)

(72) Inventors: Shreya Kadambi, San Diego, CA (US); Arash Behboodi, Amsterdam (NL); Joseph Binamira Soriaga, San Diego, CA (US); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 18/054,298

(22) Filed: Nov. 10, 2022

(65) Prior Publication Data

US 2023/0152419 A1     May 18, 2023

Related U.S. Application Data

(60) Provisional application No. 63/264,040, filed on Nov. 14, 2021.

(51) Int. Cl.
*G01S 5/10*        (2006.01)
*G01S 5/00*        (2006.01)
*G01S 5/02*        (2010.01)

(52) U.S. Cl.
CPC .......... *G01S 5/0273* (2013.01); *G01S 5/0027* (2013.01); *G01S 5/0215* (2013.01); *G01S 5/10* (2013.01)

(58) Field of Classification Search
CPC .... G01S 5/0273; G01S 5/0027; G01S 5/0215; G01S 5/10; G01S 5/0278
See application file for complete search history.

(56) References Cited

U.S. PATENT DOCUMENTS 9,088,901 B2 *   7/2015   Hu .................... H04W 24/02
9,880,259 B2 *   1/2018   Ramlall ............... G01S 5/0273
(Continued)

FOREIGN PATENT DOCUMENTS

CN       108696932 B      3/2020
CN       113595711 A  * 11/2021
(Continued)

OTHER PUBLICATIONS

Ayyalasomayajula R., et al., "Deep Learning based Wireless Localization for Indoor Navigation", 26th Annual International Conference on Mobile Computing and Networking (MobiCom '20), Sep. 21-25, 2020, 14 pages.
(Continued)

*Primary Examiner* — Olumide Ajibade Akonai
*Assistant Examiner* — Bongani Jabulani Mashele
(74) *Attorney, Agent, or Firm* — Patterson & Sheridan LLP

(57) ABSTRACT

Certain aspects of the present disclosure provide methods, apparatus, and systems for predicting a location of a device in a spatial environment using a machine learning model. An example method generally includes measuring a plurality of signals received from a network entity at a device. A channel state information (CSI) measurement is generated from the measured plurality of signals. Generally, the CSI measurement includes a multipath component. Positions of one or more anchors in a spatial environment are identified based on a machine learning model trained to identify the positions of the one or more anchors based on the CSI measurement. A location of the device is estimated based on the identified positions of the one or more anchors.

26 Claims, 7 Drawing Sheets

(56) References Cited

U.S. PATENT DOCUMENTS

| | | | |
|---|---|---|---|
| 2019/0362237 A1* | 11/2019 | Choi | G06N 3/044 |
| 2022/0167305 A1 | 5/2022 | Yang et al. | |

FOREIGN PATENT DOCUMENTS

| | | | |
|---|---|---|---|
| WO | WO-2020223689 A1 * | 11/2020 | H04W 64/003 |
| WO | 2021028049 A1 | 2/2021 | |

OTHER PUBLICATIONS

Barron A., et al., "The Minimum Description Length Principle in Coding and Modeling", IEEE Transactions on Information Theory, vol. 44, No. 6, Oct. 1998, pp. 2743-2760.

Boots B., et al., "A Spectral Learning Approach to Range-Only SLAM", 2012, pp. 1-4.

Djugash J., et al., "A Robust Method of Localization and Mapping Using Only Range", Experimental Robotics, The Eleventh International Symposium, STAR 54, 2009, pp. 341-351.

Durrant-Whyte H., et al., "Simultaneous Localization and Mapping: Part I", IEEE Robotics & Automation Magazine, Jun. 2006, pp. 99-108.

Ge Y., et al., "Exploiting Diffuse Multipath in 5G SLAM", Globecom 2020—2020 IEEE Global Communications Conference, 2020, 6 pages.

Gentner C., et al., "Indoor Positioning using Time Difference of Arrival between Multipath Components", 2013 International Conference on Indoor Positioning and Indoor Navigation, Oct. 28-31, 2013, 10 pages.

Gentner C., et al., "Multipath Assisted Positioning with Simultaneous Localization and Mapping", IEEE Transactions on Wireless Communications, vol. 15, No. 9, Sep. 2016, pp. 6104-6117.

Girshick R., "Fast R-CNN," arXiv preprint arXiv: 1504.08083v2, Sep. 27, 2015, pp. 1-9.

Herranz F., et al., "A Comparison of SLAM Algorithms with Range Only Sensors", 2014 IEEE International Conference on Robotics & Automation (ICRA), May 31-Jun. 7, 2014, pp. 4606-4611.

Kanhere O., et al., "Map-Assisted Millimeter Wave Localization for Accurate Position Location", GLOBECOM 2019—2019 IEEE Global Communications Conference, Hawaii, U.S.A, Dec. 2019, pp. 1-6.

Kim H., et al., "5G mmWave Cooperative Positioning and Mapping Using Multi-Model PHD Filter and Map Fusion", IEEE Transactions on Wireless Communications, vol. 19, No. 6, Jun. 2020, pp. 3782-3795.

Kuhn H.W., "The Hungarian Method for the Assignment Problem", Mar. 1955, pp. 83-97.

Leitinger E., et al., "Cognitive Indoor Positioning and Tracking using Multipath Channel Information", arXiv:1610.05882v2 [cs. RO], Oct. 19, 2021, 11 pages.

Leitinger E., et al., "Evaluation of Position-related Information in Multipath Components for Indoor Positioning", arXiv:1409.1467v2 [cs.IT], Dec. 10, 2018, 20 pages.

Leitinger E., et al., "Multipath-based SLAM using Belief Propagation with Interacting Multiple Dynamic Models", arXiv:2103.12809v1 [eess.SP], Mar. 23, 2021, 5 pages.

Naseri H., et al., "Cooperative Simultaneous Localization and Mapping by Exploiting Multipath Propagation", IEEE Transactions on Signal Processing, vol. 65, No. 1, Jan. 1, 2017, pp. 200-211.

Remcom, "Electromagnetic Simulation Software", 2022, 5 pages.

Roy R., et al., "ESPRIT—Estimation of Signal Parameters Via Rotational Invariance Techniques", IEEE Transactions on Acoustics Speech and Signal Processing, vol. 37, No. 7, Jul. 1989, pp. 984-995.

Schmidt R.O., "Multiple Emitter Location and Signal Parameter Estimation", IEEE Transactions on Antennas and Propagation, IEEE Service Center, Piscataway, NJ, US LNKDD0I: 10.1109/TAP. 1986.1143830, vol. AP-34, No. 3, Mar. 1, 1986 (Mar. 1, 1986), pp. 276-280.

Thrun S., et al., "The GraphSLAM Algorithm with Applications to Large-Scale Mapping of Urban Structures," International Journal of Robotics Research, vol. 25, No. 5-6, May-Jun. 2006, pp. 403-429.

Ulmschneider M., et al., "Multiple Hypothesis Data Association for Multipath-Assisted Positioning", 2017 14th Workshop on Positioning, Navigation and Communications (WPNC), 2017, pp. 1-6.

Yi K., et al., "Probabilistic End-to-end Noise Correction for Learning with Noisy Labels", CVPR, 2019, pp. 7017-7025.

Zaheer M., et al., "Deep Sets", 31st Conference on Neural Information Processing Systems, 2017, Long Beach, CA, USA, pp. 1-29.

International Search Report and Written Opinion—PCT/US2022/ 079680—ISA/EPO—Mar. 29, 2023.

* cited by examiner

UNSUPERVISED LOCATION ESTIMATION AND MAPPING BASED ON MULTIPATH MEASUREMENTS

CROSS-REFERENCE TO RELATED APPLICATIONS

This application claims benefit of and priority to U.S. Provisional Patent Application Ser. No. 63/264,040, entitled "Unsupervised Location Estimation and Mapping Based on Multipath Measurements," filed Nov. 14, 2021, and assigned to the assignee hereof, which is incorporated by reference herein in its entirety.

INTRODUCTION

Aspects of the present disclosure relate to using machine learning to estimate the location of a device in a wireless communications system.

In a wireless communications system, location estimation (e.g., relative to one or more network entities) may be used to estimate a location of a device (e.g., a user equipment (UE)) within a spatial environment. This estimated location may be used in various tasks, such as identifying various parameters for subsequent transmissions in the wireless communications system. For example, location estimation can be used to identify one or more directional beams to use in communicating between a network entity, such as a base station, and a UE, to identify beamforming patterns to apply to allow for directionality in signal processing, and the like.

Various techniques can be used for location estimation in a wireless communications system. In one example, a device may perform location estimation based on triangulation or trilateration of signaling received from multiple anchors. Time difference of arrival (TDoA) and/or time of flight (ToF) information, as well as angle of arrival (AoA) information, may be used to identify the locations of the devices that transmitted the signaling used for location estimation, and thus, to triangulate a location of the device in a spatial environment. In another example, fingerprinting based on data that correlates with location information (e.g., a received signal strength indicator (RSSI), channel state information (CSI) measurements, etc.) may be used to predict the location of a device. However, these techniques may impose timing coordination constraints on the anchors in a network and may be specific to a given spatial environment.

BRIEF SUMMARY

Certain aspects provide a method for training a machine learning model to predict the location of a device in a spatial environment. An example method generally includes receiving a data set comprising channel state information (CSI) measurements. A data set of timing information is extracted from the CSI measurements. A machine learning model is trained, based on the data set of timing information, to predict a location of a device in a spatial environment and a location of each virtual anchor of one or more virtual anchors in the spatial environment.

Certain aspects provide a method for predicting a location of a device in a spatial environment using a machine learning model. An example method generally includes measuring a plurality of signals received at a device from a network entity. A channel state information (CSI) measurement is generated from the measured plurality of signals. Generally, the CSI measurement includes a multipath component. Positions of one or more anchors in a spatial environment are identified using a machine learning model trained to identify the positions of the one or more anchors based on the CSI measurement. A location of the device is estimated based on the identified positions of the one or more anchors.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
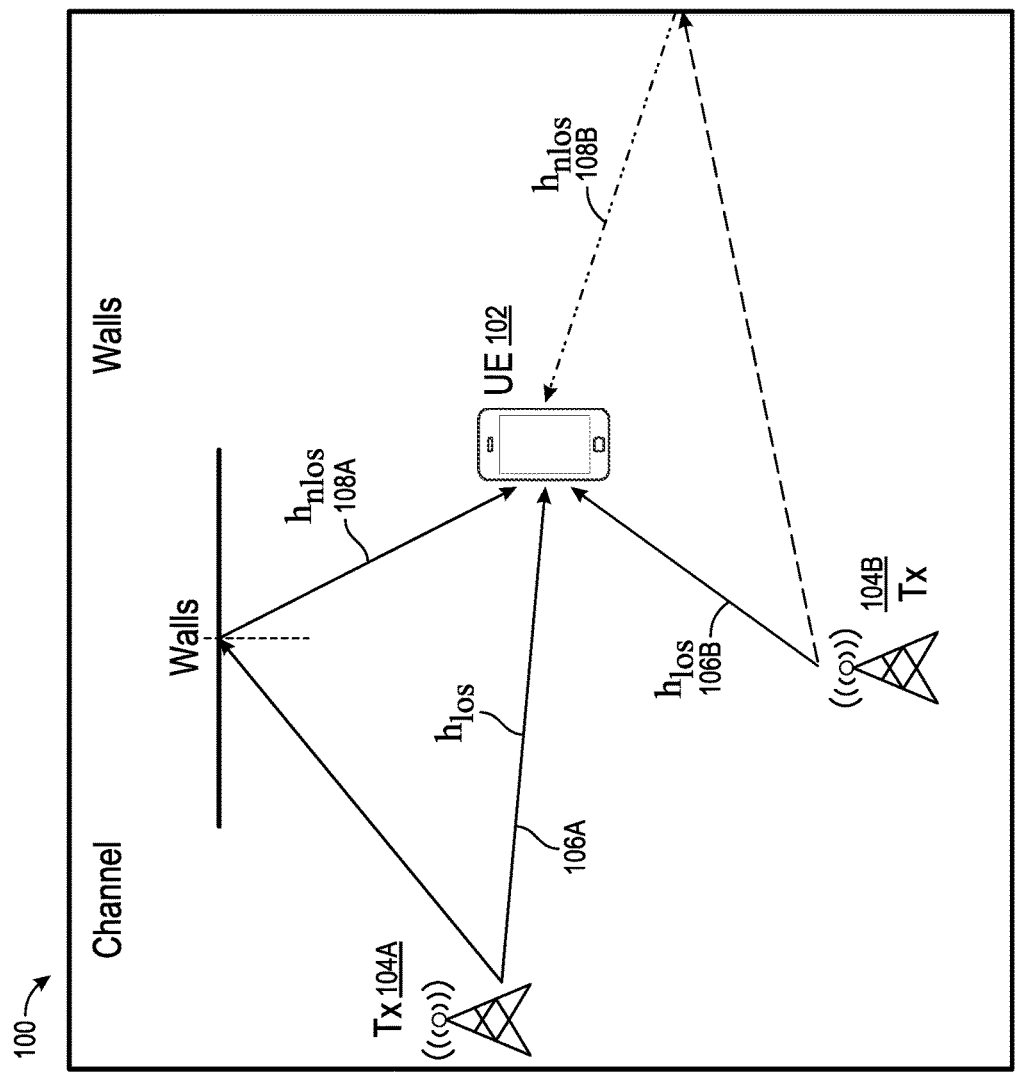
FIG. 1 depicts an example environment in which transmissions from network entities have multipath components.

Aspects of the present disclosure provide techniques for predicting a spatial location of a device and spatial location(s) of one or more virtual anchors in a spatial environment, for example, in which a wireless communications system operates.

Location prediction (or estimation) techniques, such as simultaneous localization and mapping (SLAM), may be a powerful tool to aid in identifying parameters to use in wireless communications. For example, location estimation may allow for beamforming or beam selection to be performed in such a manner that maximizes the strength of signaling received by a device in a wireless communications system (e.g., a user equipment (UE)). Various techniques may be used in location estimation, such as triangulation (e.g., based on time difference of arrival (TDoA) data, angle of arrival (AoA) data, or the like) or fingerprinting based on features that correlate with the location of a device. However, triangulation may impose a coordination overhead for transmitting devices in a wireless communications system and may not be feasible in an environment in which insufficient numbers of anchors (e.g., base stations) are available for use in triangulation. Meanwhile, fingerprinting may be specific to a particular environment (e.g., an open field, a suburban area, an urban area, a room, etc.) and thus may not be generalizable to a variety of environments with different reflectivity and radio propagation characteristics.

In many environments, transmissions in a wireless communications system may have a multipath component. That is, generally, a transmission may have a line-of-sight component and one or more non-line-of-sight components. For example, in a built environment (e.g., an indoor environment, an urban environment in which buildings serve as reflectors for transmitted signals, etc.), the line-of-sight component may be a component with an uninterrupted path from a transmitting device to a receiving device, and the one or more non-line-of-sight components may include components that reflect off of objects in the built environment, such as walls or other surfaces. Because a transmission may have a multipath component, multiple signals (e.g., a line-of-sight signal and one or more non-line-of-sight signals) may exist and may be used for various purposes, such as location estimation, beam management, and the like. However, location estimation techniques such as triangulation or fingerprinting may not leverage these multipath components to estimate the location of a device in the wireless communications system. For example, ranging techniques such as triangulation may rely on line-of-sight components in order to predict the location of a device but may not utilize non-line-of-sight information in predicting the location of the device, even though this non-line-of-sight information may include useful information. Still further, while some multipath components may include useful information for positioning tasks, other multipath components, such as diffracted or scattered components, may not include useful information for these tasks. Thus, positioning techniques that naively use multipath components may inaccurately predict the position of a device, and additional computational expense may be incurred in positioning a device while minimizing the effect of multipath components that can adversely affect the accuracy of these positioning techniques.

Aspects of the present disclosure provide techniques that allow for the use of multipath components of transmissions in a wireless communications network to predict the location(s) of one or more anchors and of a receiving device in a spatial environment. As discussed in further detail herein, received signals may be measured, and a multipath CSI measurement including CSI for a line-of-sight component and one or more non-line-of-sight components may be generated from the measured signal. Information extracted from the multipath CSI measurement, such as timing information and angle of arrival information, may be used to train a machine learning model, such as a neural network, to predict a location of a device and one or more anchors in the spatial environment from information that may not include location data itself. By using information about multipath components to predict the location of a device in a spatial environment, aspects of the present disclosure may allow for a machine learning model to predict device location and anchor location(s) in a variety of environments (e.g., such that the machine learning model is generalized across different spatial environments instead of bound to a specific spatial environment). Further, because these machine learning models can predict device and anchor locations based on multipath CSI measurements, the techniques discussed herein need not involve coordination between multiple anchors, which may reduce coordination overhead between different transmitting devices in a wireless communications system and may allow for location prediction using a reduced number of transmitting devices (e.g., when an insufficient number of anchors are present in an environment for use in triangulation-based location prediction) and may allow for location prediction based on fewer anchors than in other location estimation techniques (e.g., triangulation or trilateration). Further, aspects of the present disclosure may allow for the generation of environment maps in which reflection points for multipath components are known, which may allow for improved selection of beamforming parameters for wireless communications, improvements in initial access in wireless communications systems, and interference management and coordination.

Example Multipath Wireless System

FIG. 1 illustrates an example environment 100 in which a wireless communications system is deployed and in which signaling transmitted by devices in the wireless communications system includes a multipath component. As illustrated, environment 100 includes a user equipment (UE) 102 and one or more transmitters 104A-104B. While two transmitters are illustrated in the environment 100, it should be recognized that any number of transmitters may be present in the environment 100. Further, a single transmitter (e.g., the transmitter 104A) may include multiple transmission and reception (TRP) heads, such that multiple signals may be transmitted to and received from different directions.

A signal transmitted by the transmitters 104 may generally include line-of-sight components 106, which may be transmitted directly to the UE 102, and non-line-of-sight components 108, which may be transmitted indirectly to the UE 102. While a single non-line-of-sight component 108A-108B is illustrated for each transmitter 104A-104B, it should be recognized that any number of non-line-of-sight components 108 may exist and be received at the UE 102. The non-line-of-sight component 108 may be reflected, for example, off of walls or other surfaces in environment 100. Generally, the line-of-sight component 106 may have a shortest time of flight for a signal transmitted by a given transmitter, and the non-line-of-sight component(s) 108 may have longer times of flight than the line-of-sight component 106 because the distance over which the non-line-of-sight component(s) 108 travel from a specific transmitter 104 to the UE 102 may be greater than the distance over which the line-of-sight component 106 travels from the specific transmitter 104 to the UE 102.

The multipath components of a transmitted signal (e.g., the line-of-sight component 106 and the non-line-of-sight component(s) 108) may each be associated with unique timing information and angle of arrival information. Because each multipath component may be associated with unique timing information and angle of arrival information, each multipath component may be used, effectively, as a line-of-sight component from a different anchor point (real or virtual) in environment 100 serving as an origin for any of the multipath components of the transmitted signal (as described in further detail with respect to FIG. 2 below).

Figure 2:
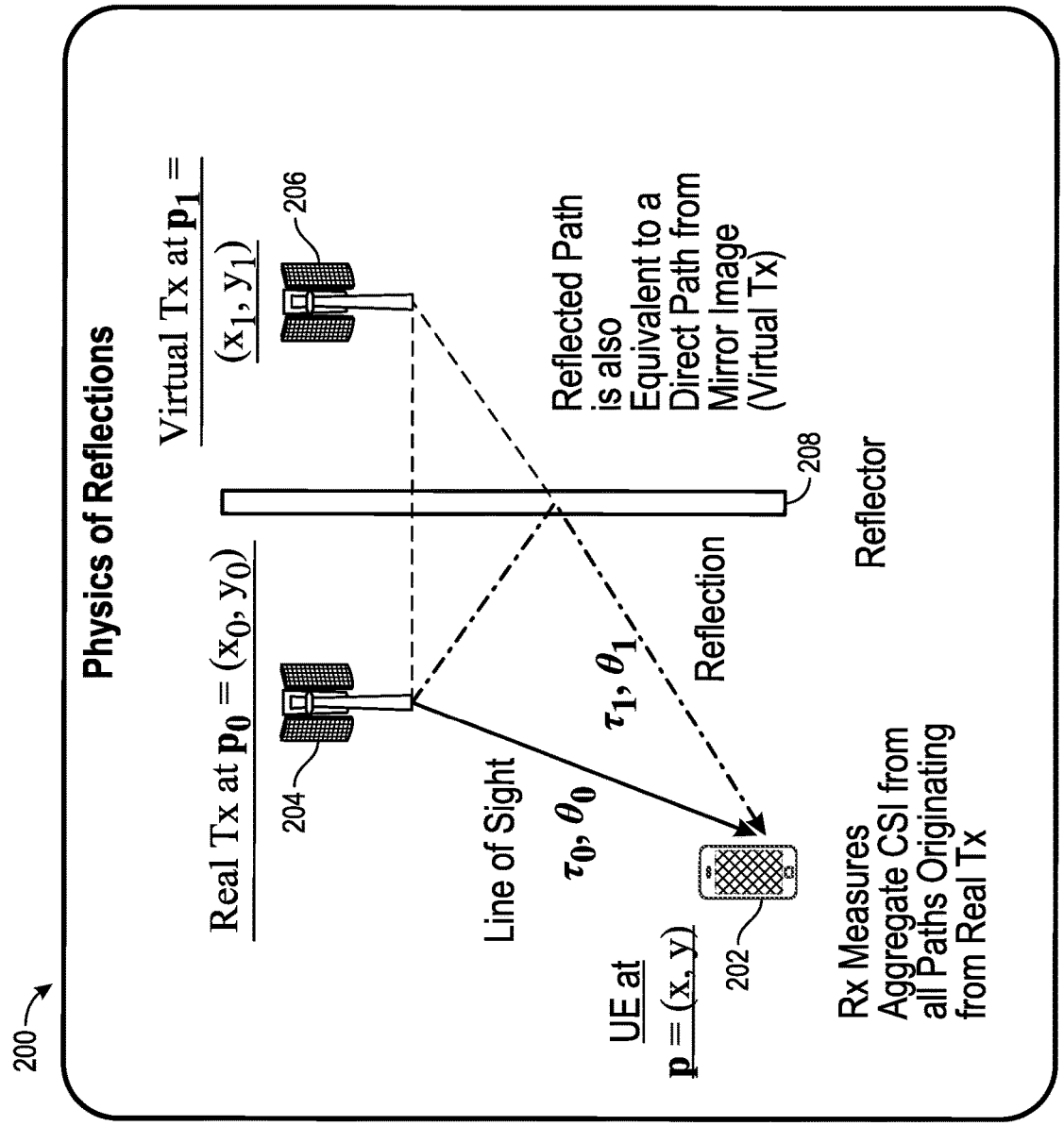
FIG. 2 depicts an example of virtual anchor positioning in a spatial environment based on a non-line-of-sight signal received at a user equipment (UE).

FIG. 2 illustrates an example environment 200 in which a non-line-of-sight component of a signal transmitted to a UE by a real transmitter may be treated as a line-of-sight component of a signal transmitted to the UE by a virtual transmitter. As illustrated, the environment 200 includes a UE 202 positioned at point p=(x, y) and a real transmitter 204 positioned at point $p_0=(x_0, y_0)$. A line-of-sight component of a signal transmitted by the real transmitter 204 may have a time of flight to the UE 202 of $\tau_0$ and an angle of arrival of $\theta_0$, and a non-line-of-sight component of the signal transmitted by the real transmitter 204 may have a time of flight to the UE 202 of $\tau_1$ and an angle of arrival of $\theta_1$. The non-line-of-sight component may result, for example, from the signal transmitted by the real transmitter 204 being reflected from a reflector 208 in a built environment (e.g., a wall or other surface that can reflect signals in the environment 200).

The properties of a reflected path of a non-line-of-sight signal may be equivalent to the properties of a direct path from a virtual transmitter 206 in the environment 200. For example, the non-line-of-sight may be equivalent to a line-of-sight path from a mirror image of the real transmitter 204 mirrored from the surface from which the non-line-of-sight component was reflected. Thus, in the environment 200, the non-line-of-sight component, of the signal transmitted by the real transmitter 204 with a time of flight to the UE 202 of $\tau_1$ and an angle of arrival of $\theta_1$ may be treated as equivalent to a line-of-sight component of a signal transmitted by a virtual transmitter 206 positioned at point $p_1=(x_1, y_1)$. For example, where the reflector 208 is part of a boundary defining a spatial environment, $p_1$ (and thus, the location of the virtual transmitter 206) may be located outside of the boundary defining the spatial environment, even though the real transmitter 204 from which the non-line-of-sight signal was transmitted is located within the boundaries of the spatial environment.

To generate a training data set that may be used to train machine learning models that can generate location estimates for devices within a spatial environment, the UE 202 may generate, based on measurements of received signaling, various unlabeled measurements that can be used to identify the locations of the real transmitter 204 and the one or more virtual transmitters 206 in the environment 200. For example, the UE may compute channel state information (CSI) measurements, time-of-flight measurements, time-difference-of-arrival measurements, angle-of-arrival measurements, and the like. These measurements may be unlabeled (e.g., not labeled with location information), as the UE may not have knowledge of a location in a spatial environment from which the signaling used to compute CSI, time of flight, time difference of arrival, angle of arrival, etc. is transmitted.

An unlabeled time of flight measurement, $ToF_u$, may be calculated according to the equation:

$$ToF_u = \tau_n = \frac{\|p - p_n\|}{c}$$

where n represents an $n^{th}$ anchor (e.g., the real transmitter 204 or the virtual transmitter 206, depending on whether the time of flight information is associated with a line-of-sight or non-line-of-sight component) in the environment 200, p represents a position of the UE 202, $p_n$ represents the position of the $n^{th}$ anchor, and c represents the speed of light.

An unlabeled angle of arrival, $AoA_u$, may be calculated according to the equation:

$$AoA_u = \theta_n = \arctan\frac{(x - x_n)}{(y - y_n)}$$

where n again represents the $n^{th}$ anchor, x and y are spatial coordinates for the UE 202, and $x_n$ and $y_n$ are spatial coordinates for the $n^{th}$ anchor. A task in location estimation may be to identify the location $p_{uE} \in \mathbb{R}^3$ of the UE 202 and each anchor (e.g., a real transmitter 204 or a virtual transmitter 206) $\{p_0, p_1 .. p_n\} \in \mathbb{R}^{k \times 3}$ in the environment 200. However, measurements may be noisy and include a varying number of measurements (e.g., time-of-flight measurements) for each UE, the number of virtual anchors (e.g., reflection points on which non-line-of-sight signals are reflected) in the environment 200 may be unknown, and the measurements may not be associated with any specific virtual anchor. Thus, raw measurements may not be sufficient to identify the virtual anchors in the environment 200 and a location of any specific UE in the environment 200.

To predict the locations of a UE and one or more anchors in an environment, aspects of the present disclosure, timing information (e.g., time of flight, time difference of arrival, etc.) may be reconstructed. Given a training data set, for example, of timing and angle-of-arrival information $\{\tau\}$ and $\{\theta\}$, a neural network may simultaneously learn the location of the UE $p_{UE}$ in the environment and the locations $\{p_0, p_1, \ldots, p_n\}$ of one or more anchors in the environment. To do so, the environment may be parametrized using one or more learnable parameters, where $p_0$ represents the location of the anchor that is the real transmitter in the environment and $p_n$ represents the locations of the virtual anchors in the environment (e.g., all anchors with indices n not equal to 0). A neural-network-based encoder may be used to predict $p_{UE}$ based on a variable-sized input. A loss function may be used at an output layer of the encoder to optimize network parameters and the locations of the virtual anchors. For example, the loss function may be represented according to the equation:

$$\sum_{u \in \mathcal{U}} \ell\left(\{\tau_{n,u}, n \in I_u\}, \left\{\frac{\|p_u - p_n\|}{c}, n \in \{0, \ldots, N_{VA}\}\right\}\right)$$

where n corresponds to an index of the virtual anchor and the associated timing information, $\tau_{n,u}$ corresponds to time-of-flight information for a signal received at the UE from the $n^{th}$ virtual anchor, $p_u$ represents a position of the UE 202, $p_n$ represents the position of the $n^{th}$ anchor, c represents the speed of light, $N_{VA}$ represents the number of virtual anchors, and u indicates that the timing information $\tau$ is unlabeled. As discussed in further detail below, a decoder model can subsequently decode the encoded location of the UE to identify the location(s) of one or more virtual anchors, as discussed in further detail below.

Figure 3:
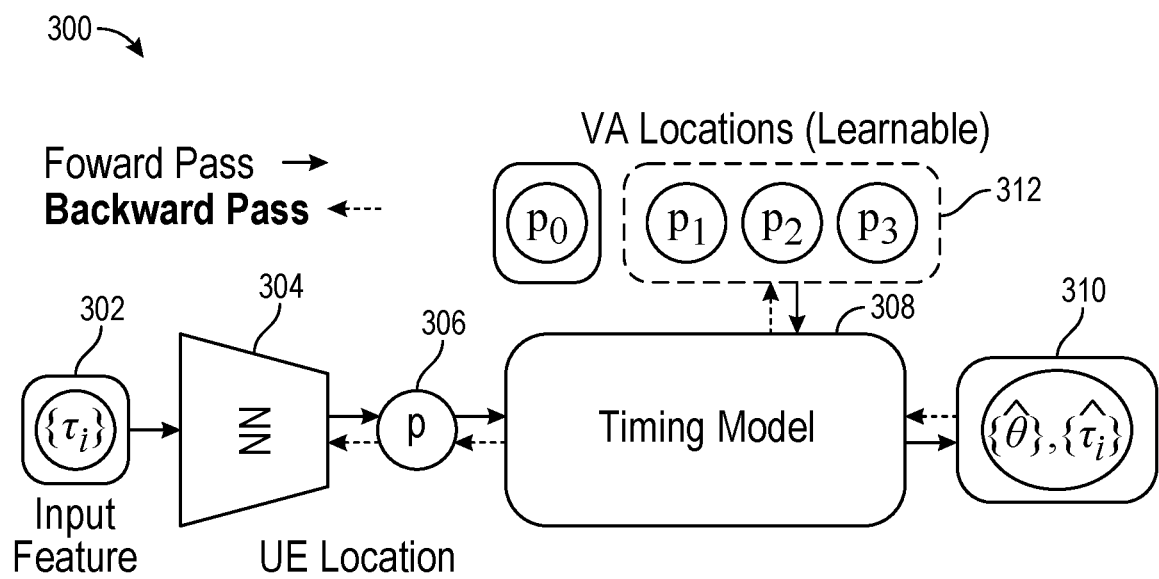
FIG. 3 depicts an example architecture of a machine learning model for predicting a location of a UE and one or more virtual anchors in a spatial environment based on timing information extracted from channel state information (CSI) measurements, according to aspects of the present disclosure.

FIG. 3 illustrates an example architecture of a machine learning model 300 for predicting locations of a user equipment and one or more virtual anchors in a spatial environment based on timing information extracted from channel state information (CSI) measurements, according to aspects of the present disclosure. As illustrated, an input feature 302 of one or more timing measurements may be provided as input to a neural network 304. A neural network 304, as discussed in further detail below, may use the input feature 302 to generate a prediction p 306 of a position of the UE in a spatial environment. The prediction p 306 may be input into a timing model 308, which may generate an output 310 of a predicted angle $\{\hat{\theta}\}$ and time $\{\hat{\tau}\}$ for a set of virtual anchors and may learn the location(s) of one or more virtual anchors $\{p_1, \ldots, p_n\}$ 312 in a spatial environment in which the UE is operating.

In some aspects, the machine learning model 300 may be structured as an encoder-decoder neural network. In this case, the neural network 304 may include or be implemented as an encoder trained to encode timing information to information associated with a location of the UE. The timing model 308 may include or be implemented as a decoder trained to decode location(s) of the one or more virtual anchors based on timing information associated with the location of the user equipment. A forward pass through the machine learning model 300 may result in the generation of predicted timing information for each location of a set of locations at which a virtual anchor may be located, and a backward pass may be used to minimize a loss function, such as the loss function described above or the time-of-flight or angle-of-arrival loss function described in further detail below, based on actual timing information and predicted timing information for the virtual anchors, as discussed in further detail below.

In some aspects, the set of input features 302 may be extracted from channel state information (CSI) measurements using various feature extraction techniques. For example, a plurality of noisy time-of-flight or time-difference-of-arrival measurements may be extracted from one or more multipath components of the CSI measurements. Because a CSI measurement may include an unknown and variable number of features (e.g., time data points associated with different multipath components and corresponding virtual anchors), a deep set model may be used to model the variable number of inputs. As used herein, a deep set model generally refers to a model that implements set functions that are order-invariant. In this deep set model, an embedding function $f(\cdot)$ may transform each extracted feature (time data point $\tau_n$, such as a time-of-flight measurement for the $n^{th}$ virtual anchor) into a fixed-size representation $f(\tau_n)$ (e.g., in a feature space). An aggregate function $g(\cdot)$ may add each of the fixed-size representations of the extracted features (time data points) according to the equation $g(\Sigma_n f(\tau_n))$ to generate the predicted position of the UE in the environment. Generally, the deep set model or other network used to extract timing information from CSI measurements and predict the position of the UE may be permutation invariant such that any input $\{\tau_n\} \in \mathbb{R}^{k \times 3}$ in a predicted position $p_u \in \mathbb{R}^3$.

In some cases, a line-of-sight component may be assumed to be present in the CSI measurements (and thus, in the features, such as timing data points, extracted from the CSI measurements), and the line-of-sight component may be associated with an anchor position $p_{TX} \in \mathbb{R}^3$ that is assumed to be fixed. For example, the line-of-sight component may be assumed to be the component extracted from the CSI measurements with the shortest time of flight. A set-based loss function for timing information may be defined, with a regularized (smoothed) loss term for timing information for the line-of-sight component. The set-based loss function may be defined according to the equation:

$$\text{Loss} = L_\delta(\min(\{\tau_n\})\tau_{NLOS}^{pu})L_{set}(\{\tau_j\}-, \{\tau_{NLOS}^{pu}\})$$
$$\forall j \neq \arg\min(\{\tau_n\})$$

where $L_\delta(\min(\{\tau_n\}), \tau_{LOS}^{pu})$ corresponds to a smoothed loss term for the line-of-sight component and $L_{set}(\{\tau_n\}-, \{\tau_{NLOS}^{pu}\})$ corresponds to a set loss for the non-line-of-sight components. $\tau_n$ corresponds to the timing information for the $n^{th}$ multipath component, $\tau_{Los}^{pu}$ corresponds to the timing information for a known line-of-sight component, $\tau_j$ corresponds to the timing information for the $j^{th}$ multipath component, and $\tau_{NLOS}^{pu}$ corresponds to the timing information for a non-line-of-sight component.

Additionally, an angle-of-arrival loss function may be used to converge on the number of virtual anchors and the positions of those virtual anchors. The angle-of-arrival loss function, like the set-based loss function for timing information discussed above, may include a smoothed term for the line-of-sight component and a set-based loss for the non-line-of-sight components extracted from a CSI measurement. The angle-of-arrival loss function may be represented by the equation:

$$\text{Loss} = L_\delta\left(\tan(\theta_{Los}), \frac{y_{ue} - y_{anc}}{x_{ue} - x_{anc}}\right) + L_{set}\left(\{\tan(\theta_{NLos})\}, \left\{\frac{y_{ue} - y_{va_i}}{x_{ue} - x_{va_i}}\right\}\right)$$

where $L_\delta\left(\tan(\theta_{Los}), \frac{y_{ue} - y_{anc}}{x_{ue} - x_{anc}}\right)$ corresponds to a smoothed loss term for the line-of-sight angle-of-arrival component $\theta_{Los}$, and $$L_{set}\left(\{\tan(\theta_{NLos})\}, \left\{\frac{y_{ue} - y_{va_i}}{x_{ue} - x_{va_i}}\right\}\right)$$

corresponds to a set loss term for the non-line-of-sight angle-of-arrival component $\theta_{NLos}$. $x_{ue}$ and $y_{ue}$ correspond to the x-axis and y-axis positions of the UE in a spatial environment, $x_{anc}$ and $y_{anc}$ correspond to the x-axis and y-axis positions of the real anchor in the spatial environment (e.g., the anchor associated with a line-of-sight component extracted from the CSI measurement), and $x_{vai}$ and $y_{vai}$ correspond to the x-axis and y-axis positions of the $i^{th}$ virtual anchor in the spatial environment.

In some aspects, super-resolution algorithms, such as Multiple Signal Classification (MUSIC) or other algorithms that increase or otherwise enhance the resolution of an input, may be used to extract timing information (e.g., time of flight or time difference of arrival) from a CSI measurement and obtain an approximation of a number of virtual anchors in an environment in which the device (for which position information is to be estimated) is operating. Because different UEs may receive different multipath components from different subsets of virtual anchors in the environment, the approximation of the number of virtual anchors may be used to initialize a decoder (e.g., the timing model 308 illustrated in FIG. 3) to estimate or predict the locations of the appropriate number of virtual anchors in the environment.

For a given number M of measurements for each position in the environment and k subcarriers, a CSI measurement may be represented as a set of packets $\{H_{k,0}, \ldots H_{k,M}\}$. A super-resolution algorithm can generate a sample covariance matrix and use eigenvalue decomposition to estimate the signal and the noise components of the signal, and various source enumeration techniques may be used to compute the number of signal and noise components for each UE. These source enumeration methods may include, for example, Akaike information criterion (AIC), Bayesian information criterion (BIC), or minimum description length (MDL) techniques. Using peak detection and thresholding, a likelihood estimation and maximum filter techniques may be applied to the signal and noise component outputs of the super-resolution algorithm to identify the number of virtual anchors in the environment. Generally, the existence of a virtual anchor may be identified where a number of signal components in the output of the super-resolution algorithm exceeds a threshold amount. In some aspects, a time difference of arrival may also be extracted from the thresholded output of the super-resolution algorithm, and this timing information may be used (alone or in conjunction with known timing information for the real anchor in the environment) to generate a set of timing information that can be encoded into a position of the UE in the environment at the neural network 304 (e.g., the encoder portion of a machine learning model implemented using an encoder-decoder architecture), as discussed above.

Generally, the output of these super-resolution algorithms may omit some timing information (e.g., where multiple paths are similar enough as to converge on a single path). Using a set loss function in the overall loss function may address an imbalance in the size of different sets.

In some aspects, it may be noted that the super-resolution algorithms may detect false peaks in the signal and noise component estimation discussed above. These false peaks may result in a false identification of a virtual anchor. To minimize the occurrence of these false peaks being identified as a virtual anchor, probabilistic approaches may be used to learn a label distribution of noise-free and noisy distributions so that peaks associated with a noise component are not identified as associated with a virtual anchor, while peaks associated with a signal component are identified as associated with a virtual anchor.

The features extracted from CSI measurements, however, may not be associated with specific virtual anchors. Further, there may not be a one-to-one association between features (e.g., timing data points) and virtual anchors. For example, a situation may arise where data points in timing information $\tau_0, \tau_1, \tau_2$ are to be associated with virtual anchor positions $p_1, p_2, p_3, p_4, p_5$. To associate the timing data points with the virtual anchors, a Hungarian algorithm may be used. Generally, a Hungarian algorithm is a combinatorial algorithm that solves an assignment problem by finding combinations in a matrix resulting in a minimum or maximum value in the matrix.

To estimate a distance between the set of timing data points (e.g., extracted using a deep set model or a CSI encoder, as discussed above) and the virtual anchors, a data association may be calculated using the Hungarian algorithm according to the expression $\Pi_n(\{\tau_0, \tau_1, \tau_1\}$, which outputs a permutation function to be applied to the timing information $\{\tau_n\}$. The data association $A_f$ may be represented by the equation:

$$A_\ell = \min_{\Pi_k} L_\delta\left(\prod_k (\{\tau_0, \tau_1, \tau_2\}, \{p_1, p_2, p_3, p_4, p_5\})\right)$$

The computed data association may be generated based on a Huber loss or a smoothed L1 loss. Generally, generating the computed data association $A_f$ may be order agnostic, which may be useful in location estimation because the number of signal reflectors, scatters, and blockers present in a data set may be unknown. Super-resolution algorithms, such as those used to identify the number of virtual anchors in an environment as discussed above, may fuse together multiple paths that are close to each other. Using an association-based loss may provide for permutation invariance and may impose some structure over sets of data, which, once again, may solve the association problem of matching a first number of data points in timing information τ with a second number of virtual anchor positions p.

The machine learning model 300 generally allows for timing-based unsupervised learning of positioning information for a UE and anchors in a spatial environment. Thus, transmission and reception clocks need not be synchronized, and the model need not be aware of the number of multipaths in the environment or the location of a transmitting network entity (e.g., base station, gNodeB, eNodeB, etc.) in the environment. The machine learning model 300 may allow for location prediction or estimation to be performed in various environments, regardless of a number of reflectors in the environment, the size (area) and shape of the environment, and the like. Further, the machine learning model 300 may scale to include multipath components that reflect multiple times in the environment, as additional reflections may be treated as increases in distance between a virtual anchor associated with a multipath component and the UE.

Figure 4:
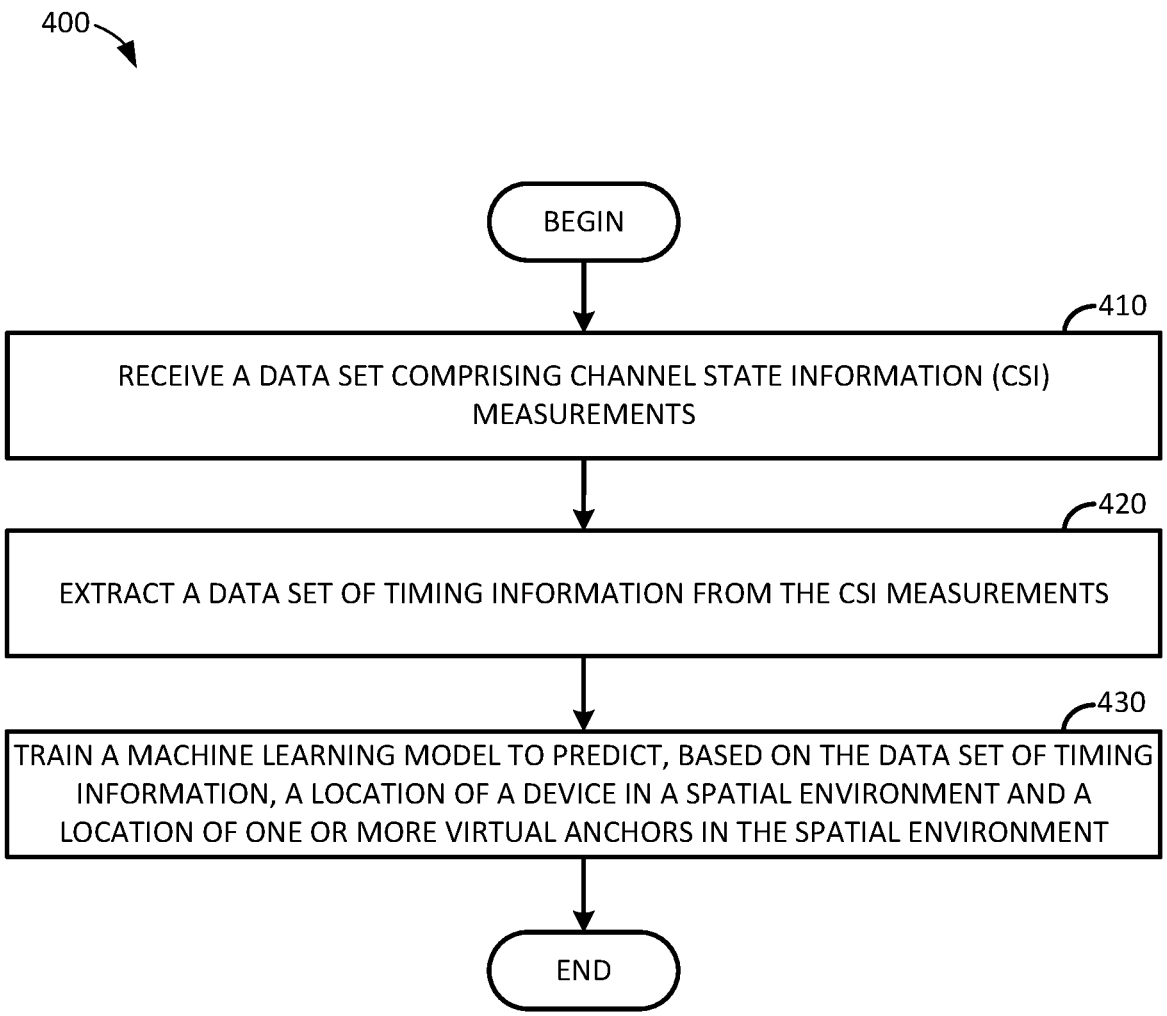
FIG. 4 depicts example operations for training a machine learning model to predict a location of a device and location(s) of one or more virtual anchors in a spatial environment, according to aspects of the present disclosure.

Example Operations for Predicting a Device's Location Using Machine Learning Models FIG. 4 illustrates example operations 400 for training a machine learning model to predict a location of a device and a location of each of one or more virtual anchors in a spatial environment, according to aspects of the present disclosure. The operations 400 may be performed, for example, by a computing device that can train the machine learning model and deploy the machine learning model to another device for use in location prediction in a spatial environment. For example, the computing device may be configured to deploy the machine learning model to a UE 102 illustrated in FIG. 1 or a UE 202 illustrated in FIG. 2.

As illustrated, the operations 400 begin at block 410, where a data set comprising channel state information (CSI) measurements is received. The data set of CSI measurements may include a plurality of CSI measurements at a plurality of locations in a spatial environment and may include measurements for each of a plurality of subcarriers in a wireless network.

At block 420, a data set of timing information is extracted from the CSI measurements. In some aspects, for each respective CSI measurement in the data set of CSI measurements, time-of-flight and/or time-difference-of-arrival measurements may be extracted for one or more multipath components in the CSI measurement. That is, timing information may be extracted for a line-of-sight component in the CSI measurement and for one or more non-line-of-sight components in the CSI measurement. The timing information with a shortest time of flight out of the multipath components in the CSI measurement may be assumed to be the line-of-sight component.

In some aspects, the data set of timing information may be extracted using various super-resolution signal-processing techniques, such as MUSIC. As discussed, these super-resolution algorithms can decompose CSI measurements into signal and noise components. Using peak thresholding and likelihood estimation techniques, peaks in the signal measurements may be used to identify the number of virtual anchors in the spatial environment and timing information associated with each of the identified virtual anchors.

At block 430, a machine learning model is trained to predict a location of a device in a spatial environment and a location of each virtual anchor of one or more virtual anchors in the spatial environment, based on the data set of the timing information. In some aspects, the machine learning model may be trained to minimize a loss function based on a difference between actual timing information and predicted timing information for the one or more virtual anchors identified by the machine learning model. The loss function, for example, may include a first term associated with a line-of-sight measurement (e.g., a measurement for a line-of-sight component in the CSI measurement) and a second term associated with one or more non-line-of-sight measurements (e.g., one or more measurements for reflected components in the CSI measurement). For example, the loss functions minimized during training of the machine learning model may be the time-of-flight and/or angle-of-attack loss functions discussed above. The timing information may be time of flight, time difference of arrival, or other timing information that may be used to predict the location of a UE and of one or more virtual anchors in a spatial environment. The loss function may, in some aspects, include a first term for angle-of-arrival information associated with a line-of-sight measurement and a second term for angle-of-arrival information associated with one or more non-line-of-sight measurements.

Generally, after the machine learning model is trained, the machine learning model may be deployed to a wireless communications device, such as a user equipment (UE). The UE may use the machine learning model to identify its location in a spatial environment, identify parameters for communications with a network entity (e.g., a best beam for initial access, beamforming parameters, etc.), and the like.

Figure 5:
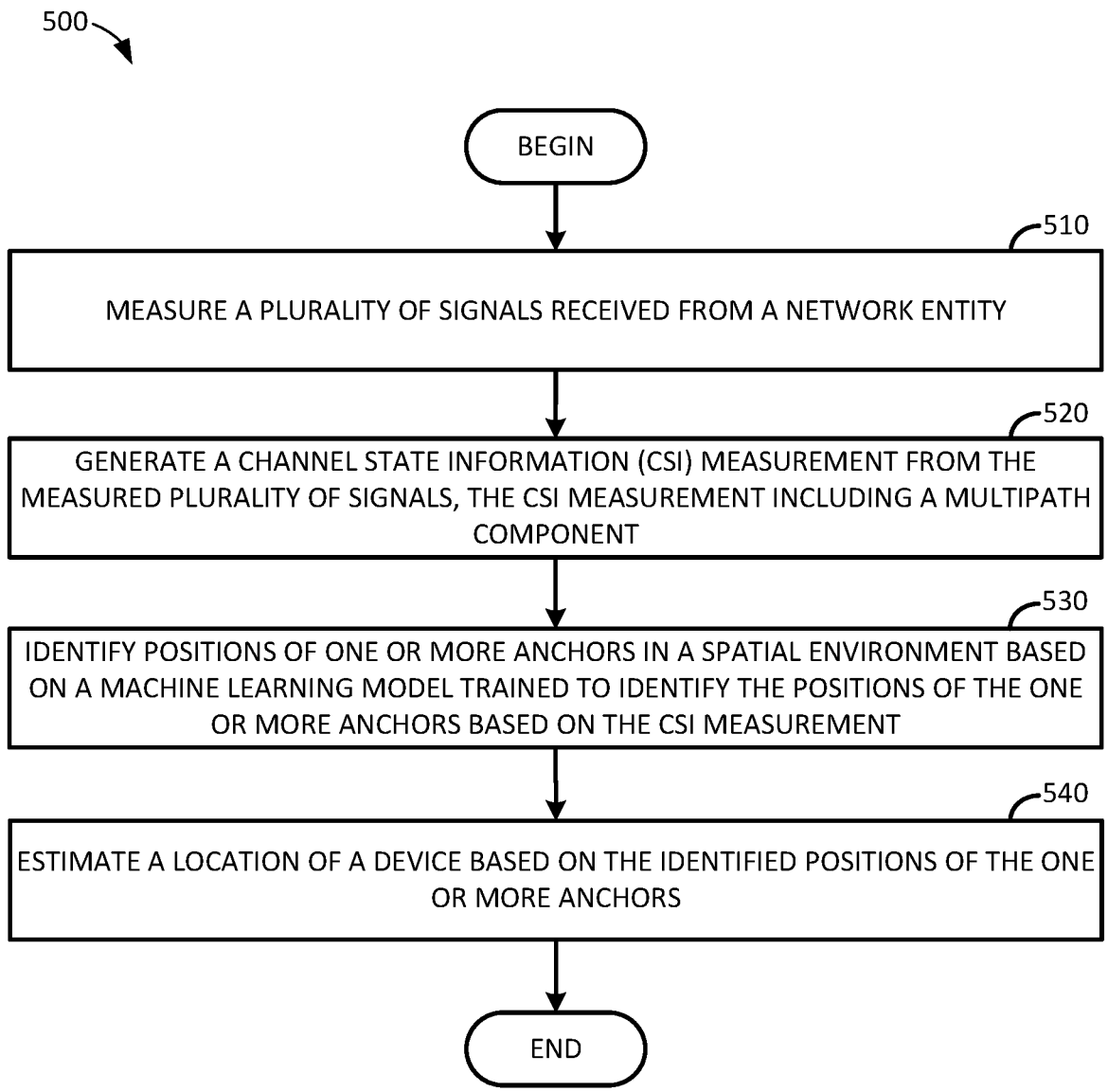
FIG. 5 depicts example operations for predicting a location of a device and location(s) of one or more virtual anchors in a spatial environment based on a machine learning model and timing information extracted from CSI measurements, according to aspects of the present disclosure.

FIG. 5 illustrates example operations 500 for predicting a location of a device and a location of each of one or more virtual anchors in a spatial environment based on a machine learning model and timing information extracted from channel state information (CSI) measurements, according to aspects of the present disclosure. The operations 500 may be performed, for example, by a device for wireless communications, such as UE 102 illustrated in FIG. 1 or UE 202 illustrated in FIG. 2.

As illustrated, the operations 500 begin at block 510, where a plurality of signals received at the device from a network entity are measured. The plurality of signals may include, for example, reference signals from which channel state information may be derived or other signals based on which other measurements (e.g., received signal strength identifier (RSSI), reference signal received power (RSRP), etc.) may be generated.

At block 520, a channel state information (CSI) measurement may be generated from the measured plurality of signals. Generally, the CSI measurement may include a multipath component. As discussed above, the multipath component may allow for information to be extracted for a line-of-sight component and one or more non-line-of-sight components, where the line-of-sight component generally corresponds to a component with a shortest time of flight (as the line-of-sight component generally corresponds to a signal that is received directly from the transmitter at the receiver and is not reflected off of other surfaces in the spatial environment) and the non-line-of-sight components generally correspond to the other components in the multipath component.

At block 530, positions of one or more anchors in a spatial environment are identified using a machine learning model trained to identify the positions of the one or more anchors based on the CSI measurement. As discussed, the machine learning model may be an encoder-decoder machine learning model in which timing information is encoded into a location in a spatial environment for the UE and in decoded into the locations of the virtual anchors in the spatial environment. To identify the positions of the one or more anchors, timing information may be extracted from the CSI measurement and input into the machine learning model. Generally, the timing information may be extracted based on a deep set model that allows for a variable number of features (time-of-flight measurements, time-distance-of-arrival measurements, etc.) to be extracted from the CSI measurement. The timing information may be used, for example, by a super-resolution model to identify a number of the virtual anchors in the spatial environment, and the decoder may be initialized with the identified number of virtual anchors. The decoder may thus be configured to identify locations for the identified number of virtual anchors, and may not identify additional virtual anchor locations in the spatial environment.

At block 540, a location of the device is estimated based on the identified positions of the one or more anchors. As discussed, the positions of the one or more anchors may be established such that each multipath component in the CSI is associated with a line-of-sight measurement from the real anchor (transmitting device, such as a network entity or base station) or one of the virtual anchors. By transforming non-line-of-sight components of a multipath measurement from the real anchor to line-of-sight components from virtual anchors, the position of the UE may be predicted based on triangulating or otherwise measuring from the real anchor and the one or more virtual anchors.

Various actions may be performed based on the estimated location of the device and the identified positions of the one or more anchors. For example, the device may generate a map of the spatial environment based on the identified positions of the one or more anchors and the estimated location of the device. The map of the spatial environment may include, for example, an indication, on a coordinate grid, of a location of the device and one or more real anchors. In some aspects, the map may further include information identifying the location of the one or more virtual anchors, as well as information identifying a reflection location in the spatial environment associated with each of the virtual anchors.

In another example, the one or more actions may include the selection of beamforming parameters for communications with the network entity based on the identified positions of the one or more anchors and the estimated location of the device. These beamforming parameters may include, for example, parameters for beamformed transmission to one or more network entities (or real anchors) in the spatial environment and parameters for beamformed reception from the one or more network entities in the spatial environment. For example, the beamforming parameters may include beamforming coefficient matrices or other parameters defining how an incoming signal is to be beamformed for reception and/or how an outgoing signal is to be beamformed for transmission to a real anchor (network entity).

In another example, the one or more actions may include reporting, to the network entity, the estimated location of the device. The network entity can use this information to generate interference management parameters for subsequent communications between the device and the network entity, which may be received the device from the network entity. The device may subsequently communicate with the network entity based on these interference management parameters.

Figure 6:
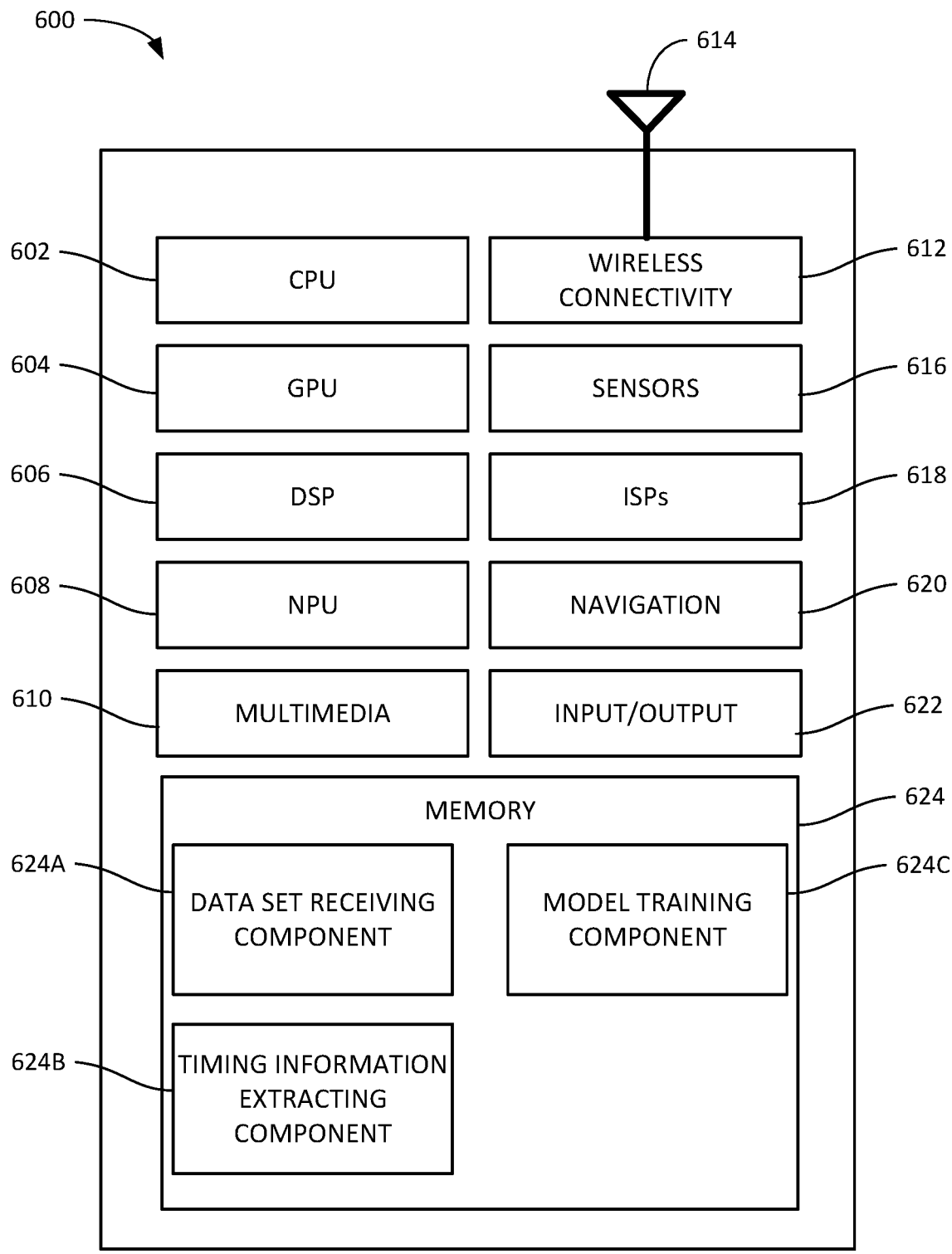
FIG. 6 depicts an example implementation of a processing system on which a machine learning model is trained to predict a location of a device and a location of each of one or more virtual anchors in a spatial environment, according to aspects of the present disclosure.

Example Processing Systems for Predicting Device and Anchor Location in Spatial Environments Using Machine Learning Models FIG. 6 depicts an example processing system 600 for training a machine learning models to predict a location of a device and a location of one or more virtual anchors in a spatial environment, such as described herein for example with respect to FIG. 4.

The processing system 600 includes a central processing unit (CPU) 602, which in some examples may be a multi-core CPU. Instructions executed at the CPU 602 may be loaded, for example, from a program memory associated with the CPU 602 or may be loaded from a memory 624.

The processing system 600 also includes additional processing components tailored to specific functions, such as a graphics processing unit (GPU) 604, a digital signal processor (DSP) 606, a neural processing unit (NPU) 608, a multimedia component 610, and a wireless connectivity component 612.

An NPU, such as the NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece through an already trained model to generate a model output (e.g., an inference).

In one implementation, the NPU 608 is a part of one or more of the CPU 602, GPU 604, and/or DSP 606.

In some examples, the wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. The wireless connectivity component 612 is further coupled to one or more antennas 614.

In some examples, one or more of the processors of the processing system 600 may be based on an ARM or RISC-V instruction set.

The processing system 600 may also include one or more sensor processing units 616 associated with any manner of sensor, one or more image signal processors (ISPs) 618 associated with any manner of image sensor, and/or a navigation component 620, which may include satellite-based positioning system components (e.g., GPS or GLONASS) as well as inertial positioning system components.

The processing system 600 may also include one or more input and/or output devices 622, such as screens, touch-sensitive surfaces (including touch-sensitive displays), physical buttons, speakers, microphones, and the like.

The memory 624 is representative of one or more static and/or dynamic memories, such as a dynamic random access memory (DRAM), a flash-based static memory, and the like. In this example, the memory 624 includes computer-executable components, which may be executed by one or more of the aforementioned processing components of the processing system 600.

In particular, in this example, the memory 624 includes a data set receiving component 624A, a timing information extracting component 624B, and a machine learning model training component 624C. The depicted components, and others not depicted, may be configured to perform various aspects of the methods described herein.

Generally, the processing system 600 and/or components thereof may be configured to perform the methods described herein.

Notably, in other aspects, elements of the processing system 600 may be omitted, such as where the processing system 600 is a server computer or the like. For example, the multimedia component 610, wireless connectivity component 612, sensor processing units 616, ISPs 618, and/or navigation component 620 may be omitted in other aspects. Further, elements of the processing system 600 may be distributed, such as for training a model and using the model to generate inferences.

Figure 7:
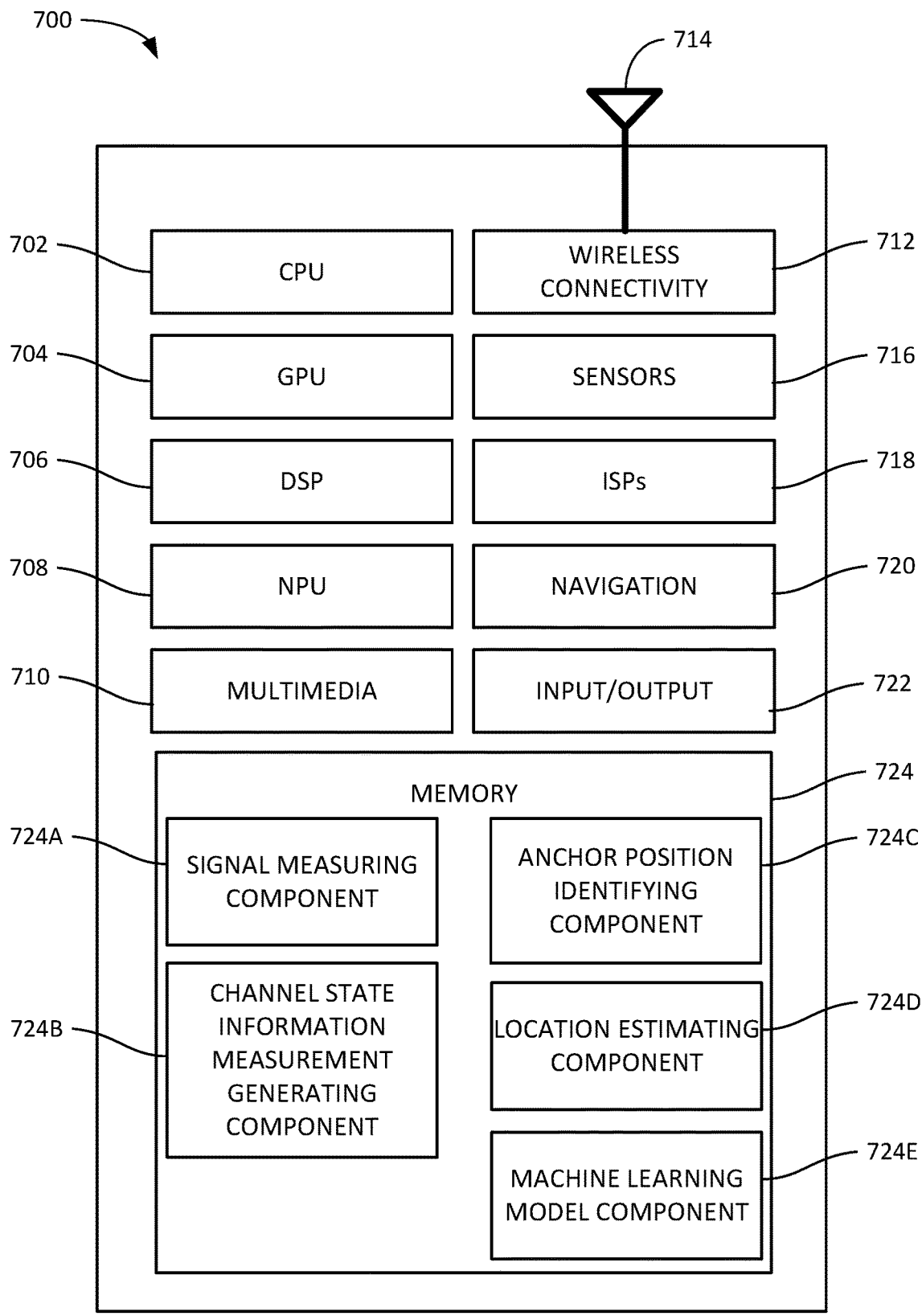
FIG. 7 depicts an example implementation of a processing system on which a machine learning model is used to predict a location of a device and a location of each of one or more virtual anchors in a spatial environment, according to aspects of the present disclosure.

FIG. 7 depicts an example processing system 700 for training a machine learning model, such as described herein for example with respect to FIG. 5.

The processing system 700 includes a central processing unit (CPU) 702, which in some examples may be a multi-core CPU. The processing system 700 also includes additional processing components tailored to specific functions, such as a graphics processing unit (GPU) 704, a digital signal processor (DSP) 706, a neural processing unit (NPU) 708, and a wireless connectivity component 712. The CPU 702, GPU 704, DSP 706, NPU 708, and wireless connectivity component 712 may be similar to the CPU 602, GPU 604, DSP 606, NPU 608, and wireless connectivity component 612, respectively, discussed above with respect to FIG. 6.

In some examples, the wireless connectivity component 712 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. The wireless connectivity component 712 may be further coupled to one or more antennas (not shown).

In some examples, one or more of the processors of the processing system 700 may be based on an ARM or RISC-V instruction set.

The processing system 700 also includes memory 724, which is representative of one or more static and/or dynamic memories, such as a dynamic random access memory, a flash-based static memory, and the like. In this example, the memory 724 includes computer-executable components, which may be executed by one or more of the aforementioned processing components of the processing system 700.

In particular, in this example, the memory 724 includes a signal measuring component 724A, a channel state information measurement generating component 724B, an anchor position identifying component 724C, a location estimating component 724D, and a machine learning model component 724E (such as the machine learning model 300 described above with respect to FIG. 3). The depicted components, and others not depicted, may be configured to perform various aspects of the methods described herein.

Generally, the processing system 700 and/or components thereof may be configured to perform the methods described herein.

Notably, in other aspects, aspects of the processing system 700 may be omitted, such as where the processing system 700 is a server computer or the like. For example, the multimedia component 710, the wireless connectivity component 712, the sensors 716, ISPs 718, and/or the navigation component 720 may be omitted in other aspects.

Example Clauses

Implementation details of various aspects of the present disclosure are described in the following numbered clauses.

Clause 1: A processor-implemented method, comprising: receiving a data set comprising channel state information (CSI) measurements; extracting a data set of timing information from the CSI measurements; and training a machine learning model to predict, based on the data set of the timing information: a location of a device in a spatial environment; and a location of each virtual anchor of one or more virtual anchors in the spatial environment.

Clause 2: The method of Clause 1, further comprising deploying the trained machine learning model to a wireless communications device.

Clause 3: The method of Clause 1 or 2, wherein training the machine learning model comprises training the machine learning model using unsupervised learning techniques.

Clause 4: The method of any of Clauses 1 through 3, wherein extracting the data set of timing information comprises, for each respective CSI measurement in the data set of CSI measurements, extracting one or more of time of flight or time difference of arrival measurements from one or more multipath components of the respective CSI measurement.

Clause 5: The method of any of Clauses 1 through 4, wherein: the machine learning model is implemented by an encoder-decoder neural network comprising an encoder and a decoder, the encoder is trained to encode timing information into data representing the location of the device, and the decoder is trained to decode the location of the one or more virtual anchors based on timing information associated with the location of the device.

Clause 6: The method of any of Clauses 1 through 5, wherein the machine learning model is trained to minimize a loss function based on a difference between actual timing information and predicted timing information for the one or more virtual anchors identified by the machine learning model.

Clause 7: The method of Clause 6, wherein the loss function comprises a first term for timing information associated with a line-of-sight measurement and a second term for timing information associated with one or more non-line-of-sight measurements.

Clause 8: The method of Clause 6 or 7, wherein the loss function comprises a first term for angle-of-arrival information associated with a line-of-sight measurement and a second term for angle-of-arrival information associated with one or more non-line-of-sight measurements.

Clause 9: The method of any of Clauses 1 through 8, wherein extracting the data set of timing information from the data set of CSI measurements comprises extracting the timing information based on super-resolution signal processing.

Clause 10: The method of any of Clauses 1 through 9, wherein the machine learning model is configured to associate a number of timing information samples with a number of anchor positions.

Clause 11: A processor-implemented method, comprising: measuring a plurality of signals received from a network entity at a device; generating a channel state information (CSI) measurement from the measured plurality of signals, the CSI measurement including a multipath component; identifying positions of one or more anchors in a spatial environment using a machine learning model trained to identify the positions of the one or more anchors based on the CSI measurement; and estimating a location of the device based on the identified positions of the one or more anchors.

Clause 12: The method of Clause 11, further comprising generating a map of the spatial environment based on the identified positions of the one or more anchors and the estimated location of the device.

Clause 13: The method of Clause 11 or 12, further comprising selecting beamforming parameters for communications with the network entity based on the identified positions of the one or more anchors and the estimated location of the device.

Clause 14: The method of any of Clauses 11 through 13, further comprising: reporting, to the network entity, the estimated location of the device; receiving, from the network entity, interference management parameters for subsequent communications with the network entity; and communicating with the network entity based on the interference management parameters.

Clause 15: The method of any of Clauses 11 through 14, wherein identifying the positions of the one or more anchors in the spatial environment comprises: extracting, from the CSI measurement, a set of timing information, each entry in the set of timing information being associated with one of a plurality of multipath components in the CSI measurement; and inputting the extracted set of timing information into the machine learning model to identify the positions of the one or more anchors.

Clause 16: The method of Clause 15, further comprising identifying a location of the device in the spatial environment based on the set of timing information and a deep set model.

Clause 17: The method of Clause 15 or 16, further comprising estimating a number of virtual anchors of the one or more anchors in the spatial environment based on the extracted set of timing information, wherein the number of the virtual anchors is initialized in a decoder.

Clause 18: A processing system comprising: a memory comprising computer-executable instructions; and one or more processors configured to execute the computer-executable instructions and cause the processing system to perform a method in accordance with any of Clauses 1-17.

Clause 19: A processing system comprising means for performing a method in accordance with any of Clauses 1-17.

Clause 20: A non-transitory computer-readable medium comprising computer-executable instructions that, when executed by one or more processors of a processing system, cause the processing system to perform a method in accordance with any of Clauses 1-17.

Clause 21: A computer program product embodied on a computer-readable storage medium comprising code for performing a method in accordance with any of Clauses 1-17.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
measuring a plurality of signals received from a network entity at a device;
generating a channel state information (CSI) measurement from the measured plurality of signals, the CSI measurement including a multipath component;
identifying positions of one or more anchors in a spatial environment using a machine learning model trained to identify the positions of the one or more anchors based on the CSI measurement;
estimating a location of the device based on the identified positions of the one or more anchors;
reporting, to the network entity, the estimated location of the device;
receiving, from the network entity, interference management parameters for subsequent communications with the network entity; and
communicating with the network entity based on the interference management parameters.

2. The method of claim 1, further comprising generating a map of the spatial environment based on the identified positions of the one or more anchors and the estimated location of the device.

3. The method of claim 1, further comprising selecting beamforming parameters for communications with the network entity based on the identified positions of the one or more anchors and the estimated location of the device.

4. The method of claim 1, wherein identifying the positions of the one or more anchors in the spatial environment comprises:
extracting, from the CSI measurement, a set of timing information, each entry in the set of timing information being associated with one of a plurality of multipath components in the CSI measurement; and
inputting the extracted set of timing information into the machine learning model to identify the positions of the one or more anchors.

5. The method of claim 4, further comprising identifying the location of the device in the spatial environment based on the set of timing information and a deep set model.

6. The method of claim 4, further comprising estimating a number of virtual anchors of the one or more anchors in the spatial environment based on the extracted set of timing information, wherein the number of the virtual anchors is initialized in a decoder.

7. A processor-implemented method, comprising:
receiving a data set comprising channel state information (CSI) measurements;
extracting a data set of timing information from the CSI measurements; and
training a machine learning model to predict, based on the data set of the timing information:
a location of a device in a spatial environment; and
a location of each virtual anchor of one or more virtual anchors in the spatial environment;
wherein the machine learning model is configured to associate a number of timing information samples with a number of anchor positions.

8. The method of claim 7, further comprising deploying the trained machine learning model to a wireless communications device.

9. The method of claim 7, wherein training the machine learning model comprises training the machine learning model using unsupervised learning techniques.

10. The method of claim 7, wherein extracting the data set of the timing information comprises, for each respective CSI measurement in the data set comprising the CSI measurements, extracting one or more of time-of-flight or time-difference-of-arrival measurements from one or more multipath components of the respective CSI measurement.

11. The method of claim 7, wherein:
the machine learning model is implemented by an encoder-decoder neural network comprising an encoder and a decoder,
the encoder is trained to encode timing information into data representing the location of the device, and
the decoder is trained to decode the location of each virtual anchor based on the timing information associated with the location of the device.

12. The method of claim 7, wherein the machine learning model is trained to minimize a loss function based on a difference between actual timing information and predicted timing information for the one or more virtual anchors identified by the machine learning model.

13. The method of claim 12, wherein the loss function comprises a first term for timing information associated with a line-of-sight measurement and a second term for timing information associated with one or more non-line-of-sight measurements.

14. The method of claim 12, wherein the loss function comprises a first term for angle-of-arrival information associated with a line-of-sight measurement and a second term for angle-of-arrival information associated with one or more non-line-of-sight measurements.

15. The method of claim 7, wherein extracting the data set of the timing information from the CSI measurements comprises extracting the timing information based on super-resolution signal processing.

16. A processing system, comprising:
a memory having computer-executable instructions stored thereon; and
a processor configured to execute the computer-executable instructions in order to cause the processing system to:
measure a plurality of signals received from a network entity at a device;
generate a channel state information (CSI) measurement from the measured plurality of signals, the CSI measurement including a multipath component;
identify positions of one or more anchors in a spatial environment using a machine learning model trained to identify the positions of the one or more anchors based on the CSI measurement;
estimate a location of the device based on the identified positions of the one or more anchors;
report, to the network entity, the estimated location of the device;
receive, from the network entity, interference management parameters for subsequent communications with the network entity; and
communicate with the network entity based on the interference management parameters.

17. The processing system of claim 16, wherein the processor is further configured to cause the processing system to generate a map of the spatial environment based on the identified positions of the one or more anchors and the estimated location of the device.

18. The processing system of claim 16, wherein the processor is further configured to cause the processing system to select beamforming parameters for communications with the network entity based on the identified positions of the one or more anchors and the estimated location of the device.

19. The processing system of claim 16, wherein in order to identify the positions of the one or more anchors in the spatial environment, the processor is configured to cause the processing system to:
extract, from the CSI measurement, a set of timing information, each entry in the set of timing information being associated with one of a plurality of multipath components in the CSI measurement; and
input the extracted set of timing information into the machine learning model to identify the positions of the one or more anchors.

20. The processing system of claim 19, wherein the processor is configured to cause the processing system to identify the location of the device in the spatial environment based on the set of timing information and a deep set model.

21. The processing system of claim 19, wherein the processor is configured to cause the processing system to estimate a number of virtual anchors of the one or more anchors in the spatial environment based on the extracted set of timing information and wherein the number of the virtual anchors is initialized in a decoder.

22. A processing system, comprising:
a memory having executable instructions stored thereon; and
a processor configured to execute the executable instructions in order to cause the processing system to:

receive a data set comprising channel state information (CSI) measurements;

extract a data set of timing information from the CSI measurements; and train a machine learning model to predict, based on the data set of the timing information:
- a location of a device in a spatial environment; and
- a location of each virtual anchor of one or more virtual anchors in the spatial environment;

wherein the machine learning model is configured to associate a number of timing information samples with a number of anchor positions.

23. The processing system of claim 22, wherein in order to extract the data set of the timing information, the processor is configured to cause the processing system to extract, for each respective CSI measurement in the data set comprising the CSI measurements, one or more of time-of-flight or time-difference-of-arrival measurements from one or more multipath components of the respective CSI measurement.

24. The processing system of claim 22, wherein:
the machine learning model is implemented by an encoder-decoder neural network comprising an encoder and a decoder,
the encoder is trained to encode timing information into data representing the location of the device, and
the decoder is trained to decode the location of each virtual anchor based on the timing information associated with the location of the device.

25. The processing system of claim 22, wherein the machine learning model is trained to minimize a loss function based on a difference between actual timing information and predicted timing information for the one or more virtual anchors identified by the machine learning model.

26. The processing system of claim 22, wherein extracting the data set of the timing information from the CSI measurements comprises extracting the timing information based on super-resolution signal processing.

* * * * *